United States Patent Office 3,279,295
Patented Oct. 18, 1966

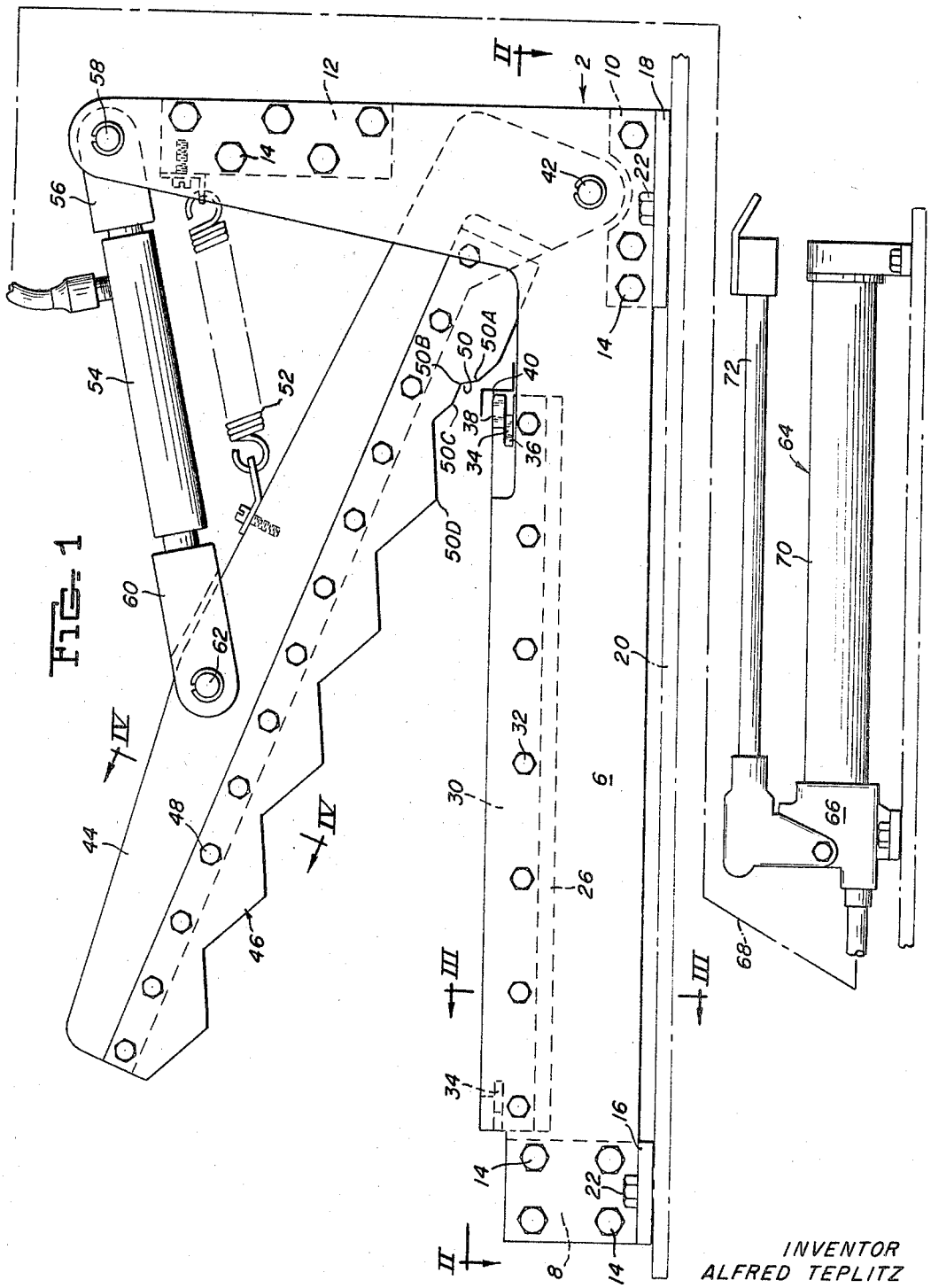

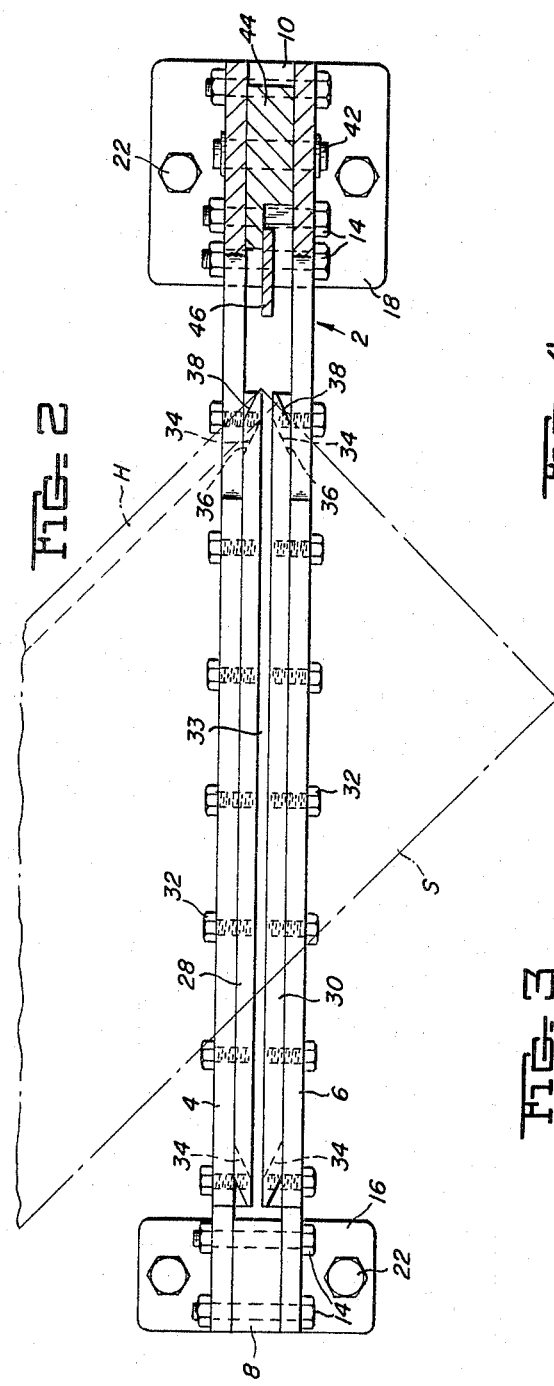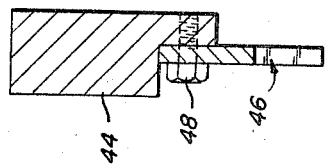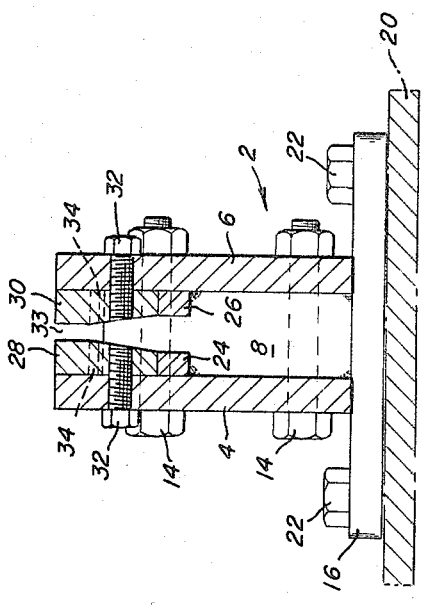

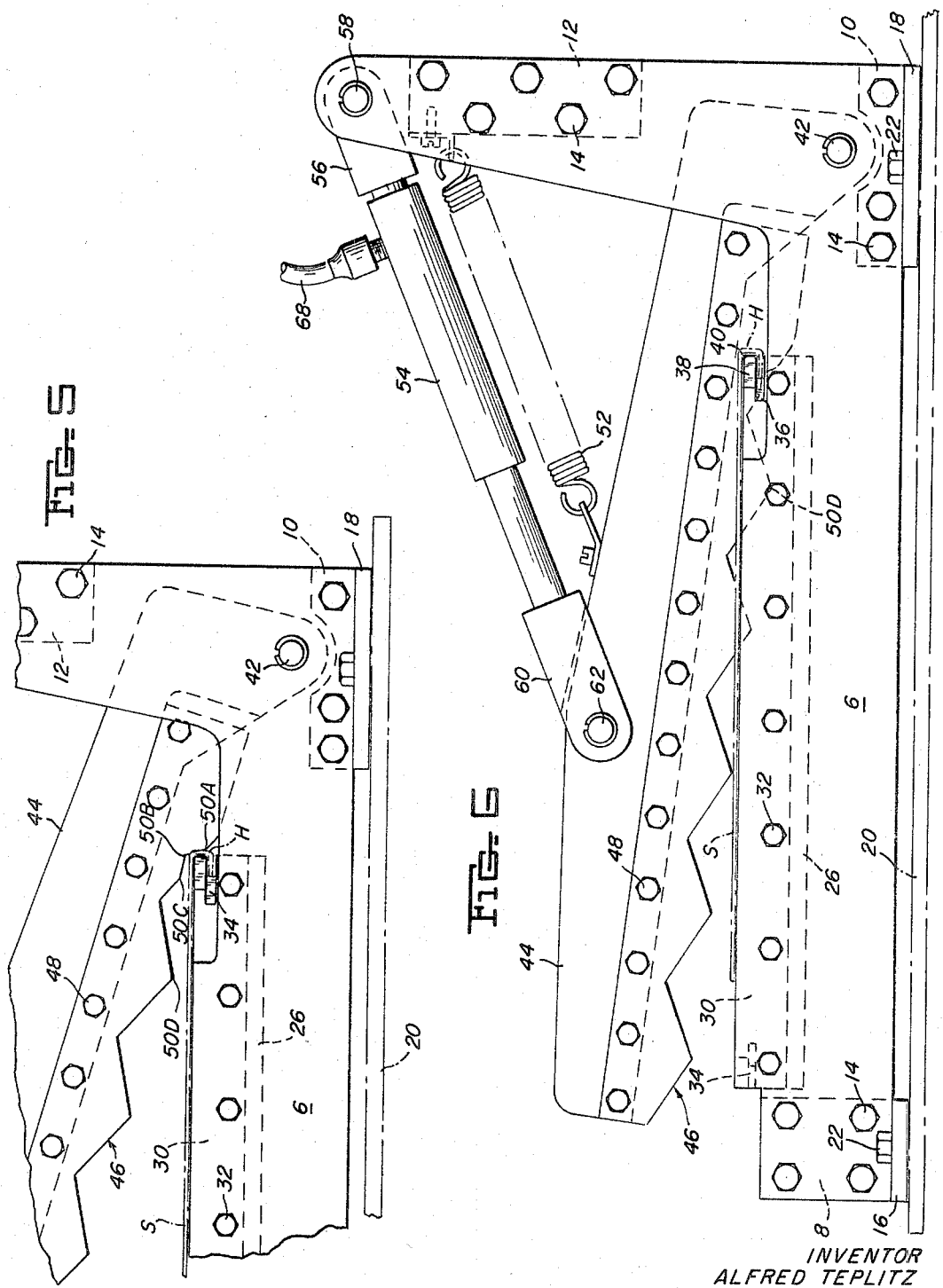

3,279,295
OSCILLATING SIDING SHEAR
Alfred Teplitz, Pittsburgh, Pa., assignor to United States Steel Corporation, a corporation of Delaware
Filed Oct. 28, 1964, Ser. No. 407,173
5 Claims. (Cl. 83—601)

This invention relates to a shear and more particularly to a shear for cutting pre-painted galvanized steel siding of the type used on the exterior surface of buildings. Such siding is made in a variety of profiles, but they all have a hook along at least one longitudinal edge. In applying siding to the building it is necessary to cut pieces square and to length for horizontal runs on the sides of the building and to cut pieces at length to an angle for gable ends. Conventional cutting tools such as a circular saw, sabre saw, abrasive saw and shears are not satisfactory for one or more of the following reasons. They produce ragged cuts which are susceptible to corrosion, generate metallic dust which tends to become embedded in the painted surface thus causing rust and discoloration, they generate heat which tends to burn the paint at the cut edges, and they require an external electric power source which is not always available at the building site.

It is therefore an object of my invention to provide a shear which can be used in the field and operated by a single workman.

Another object is to provide such a shear which can be operated by power developed by the workman.

A further object is to provide such a shear for pre-painted galvanized steel siding which will produce a cleanly sheared edge and wipe the paint and zinc coating over the sheared face of the steel so that the galvanic reaction between steel and zinc will protect the steel from rusting.

These and other objects will be more apparent after referring to the following specification and attached drawings, in which:

FIGURE 1 is an elevation of the shear of my invention;

FIGURE 2 is a view taken on the line II–II of FIGURE 1;

FIGURE 3 is a view taken on the line III—III of FIGURE 1;

FIGURE 4 is a view taken on the line IV—IV of FIGURE 1;

FIGURE 5 is a view showing a piece of siding in place to be sheared; and

FIGURE 6 is a view showing the siding partially cut.

Referring more particularly to the drawings, reference numeral 2 indicates a frame which consists of two L-shaped plates 4 and 6 separated by spacers 8, 10 and 12. The plates 4 and 6 are held together by means of bolts 14 which pass through aligned holes in the plates 4 and 6 and the respective spacers 8, 10 and 12. Spacers 8 and 10 have foot plates 16 and 18, respectively, which are attached to a base plate 20 by means of capscrews 22. It will be understood that the frame 2 may be made of a single casting or weldment instead of as described above. Horizontal supporting ledges 24 and 26 are secured to the plates 4 and 6, respectively, for knives 28 and 30, respectively. The knives 28 and 30 rest on the ledges 24 and 26 and are secured to plates 4 and 6, respectively, by means of screws 32. The knives are spaced apart to provide an opening 33 therebetween. The knives 28 and 30 are opposite hand duplicates so that only knife 28 will be described in detail. The knife 28 is generally rectangular in cross section, but as best shown in FIGURE 3 it tapers vertically from a point below its cutting edge away from knife 30 so that scrap can be easily discharged from between the knives. A horizontal slot 34 is provided in each end of the knife. While the slot adjacent spacer 8 has no function the knives are made symmetrical so as to permit turning them end for end as they wear. End 36 of the slot tapers away from the end of the knife toward the outer face thereof. The end of the knife above slot 34 is also cut away on a taper at 38 parallel to the slot end 36. The top of the knife at its end 40 has a radius approximately equal to that of hook H of siding sheet S while the portion of the knife above the slot 34 is approximately equal to the hook depth as best shown in FIGURE 6. It will be seen that the hook H is formed of a first flange normal to the sheet S and a second flange parallel to the main portion.

The plates 4 and 6 have aligned openings for receiving a pin 42 arranged with its axis horizontal and a substantial distance below the top of knives 28 and 30. For example, the axis may be 2¾ in. below the top of the knives. A knife carrier 44 is pivotally mounted on the pin 42. A serrated knife 46 is secured to the knife carrier 44 by means of screws 48. The blade 46 is of such thickness that it can pass downwardly between knives 28 and 30. As shown, the knife 46 has five serrations therein with the angle between the two sides of each serration being approximately 130°. The serration adjacent the pin 42 has a notch 50 in the side adjacent the pin 42. Because of the location of pin 42, the line 50A–50B is inclined to the vertical flange of the workpiece at an angle of approximately 5° at the moment of engagement of the blade with the sheet and is moving away from the pin 42, while line 50B–50C is also inclined to the top surface of the sheet at an angle of approximately 5° and is moving downward. The notch 50 is located to cooperate with the end of the knives 28 and 30 so as to cut through the hook H without any tearing of the sheet S. It will also be seen that point 50D engages the workpiece before any other cutting action takes place and as it pierces the work it moves it away from pin 42 so that the hook H of siding S firmly engages the hook supporting portions of the knives 28 and 30.

A spring 52 has one end attached to knife carrier 44 and the other end attached to the vertical leg of the frame 2. An hydraulic motor 54 has one end connected to the top of the vertical leg of frame 2 by means of a clevis 56 and pin 58 and the other end connected to knife carrier 44 by means of a clevis 60 and pin 62. A foot operated hydraulic pump 64 supplies fluid under pressure to motor 54 through a valve 66 and conduit 68. Motor 54 is a standard hydraulic jacking cylinder such as Blackhawk Industrial Products Company Catalogue No. RC–140 and the pump 64 is also a standard pump with integral reservoir 70 and valve 66 such as Blackhawk Industrial Products Company Catalogue No. P–80. The pump 64 is operated by repeated pressure on its foot pedal 72. Upon completion of a stroke operation of valve 66 permits fluid to return to the pump reservoir 70. Spring 52 returns the knife carrier 44 to the open position when the hydraulic fluid is released. It will be understood that fluid under pressure may be provided in any other suitable manner for operating the motor 54. It is also possible to substitute a hand lever (not shown) for motor 54.

In operation, when it is desired to make a square cut the knife holder 44 is raised to its upper or retracted position by releasing the pressure in motor 54 by means of valve 66, the spring 52 then acting to raise the knife holder. The valve 66 is then closed and the operator places the siding S in position as shown in FIGURE 6 with the hook H over the end of the knives 28 and 30. The operator then cycles the pump 64 with his foot to depress the knife carrier 44. As the knife 46 lowers, point 50D first engages the top of the siding S and moves it away from pin 42 so that the hook H is firmly in position against the ends of the bottom knives. The coaction of the notch 50 with the hook H causes the hook to be sheared cleanly without any tearing. The movement of the knife 46 will cause the zinc and paint to wipe downwardly over the sheared portion of the siding so as to protect it from corrosion. Upon completion of the cut the cutter carrier 44 is raised as described above.

When making a diagonal cut the knife holder 44 is raised to its upper position and the siding is placed in position at the desired angle as shown in FIGURE 2 with the siding hook H engaging only one knife. The cut is then made in the manner described above for making a right angle cut.

While one embodiment of my invention has been shown and described it will be apparent that other adaptations and modifications may be made without departing from the scope of the following claims.

I claim:

1. A shear for cutting a sheet of material comprising a frame, a pair of elongated shear knives supported on said frame in parallel and spaced apart relationship with an opening between the knives, the top of said knives being in a common plane, a pivoted knife carrier, a knife supported longitudinally on said knife carrier and adapted to be received in the opening between the pair of knives, and pivot means supporting said knife carrier on said frame for relative movement with respect thereto, said pivot means being located at a point spaced from one end of said pair of knives a substantial distance below the top thereof, said last named knife having a plurality of deep V-shaped serrations along the length thereof forming cutting edges, said last named knife being positioned so that the V-shaped serration at the end closest to said pivot means will extend from a point between said pivot means and said pair of shear knives to a point a substantial distance toward the opposite end of said pair of shear knives.

2. A shear for cutting a sheet having a flange at one end extending generally normal to the plane of the sheet and a second flange attached to said first flange and extending generally parallel to the plane of the sheet; said shear comprising a frame, a pair of elongated shear knives supported on said frame in parallel and spaced apart relationship with an opening between the knives, the top of said knives being in a common plane, a pivoted knife carrier, a knife supported longitudinally on said knife carrier and adapted to be received in the opening between the pair of knives, said knife having a plurality of deep V-shaped serrations on the bottom thereof forming cutting edges, and pivot means supporting said knife carrier on said frame, said pivot means being located at a point spaced from one end of said pair of knives a substantial distance below the top thereof, said last named knife being positioned so that the V-shaped serration at the end closest to said pivot means will extend from a point between said pivot means and said pair of shear knives to a point a substantial distance toward the opposite end of said pair of shear knives, each of said pair of knives having a slot therein at the said one end thereof parallel to and below the top of said pair of knives a distance substantially equal to the distance between the main portion of the sheet and the second flange, the top of the knife above said slot being tapered from the outside thereof toward said one end of the knife and the opening between the pair of knives, the slot in one knife being aligned with the slot in the other knife, said serrated knife being movable into the opening between the pair of knives to cut said sheet.

3. A shear for cutting a galvanized steel sheet having a flange at one end extending generally normal to the plane of the sheet and a second flange attached to said first flange and extending generally parallel to the plane of the sheet; said shear comprising a frame, a pair of elongated shear knives supported on said frame in parallel and spaced apart relationship with an opening between the knives, the top of said knives being in a common plane, a pivoted knife carrier, a knife supported longitudinally on said knife carrier and adapted to be received in the opening between the pair of knives, said knife having a plurality of serrations on the bottom thereof forming cutting edges, each of said serrations having two sides of substantial length connected at their top, the side of the first serration adjacent said pivot means having a two sided notch therein intermediate its length, and pivot means supporting said knife carrier on said frame, said pivot means being located at a point spaced from one end of said pair of knives a substantial distance below the top thereof, each of said pair of knives having a slot therein at the said one end thereof parallel to and below the top of said pair of knives a distance substantially equal to the distance between the main portion of the sheet and the second flange, the top of the knife above said slot being tapered from the outside thereof toward said one end of the knife and the opening between the pair of knives, the slot in one knife being aligned with the slot in the other knife, said serrated knife being movable into the opening between the pair of knives to cut said sheet, said serrated knife first contacting said sheet at the point of connection between the first and second serrations, the notch in said longitudinal knife being so positioned that its side adjacent said pivot means will cooperate with the said one end of the pair of knives to cut the first named flange.

4. A shear according to claim 3 including a fluid motor connected between said knife carrier and frame, a pump for feeding fluid under pressure to said fluid motor to feed the said knife carrier and knife to cut the sheet, and a spring extending between said knife carrier and frame to return said knife carrier to retracted position when fluid pressure is removed from said motor.

5. A shear for cutting a galvanized steel sheet having a flange at one end extending generally normal to the plane of the sheet; said shear comprising a frame, a pair of elongated shear knives supported on said frame in parallel and spaced apart relationship with an opening between the knives, the top of said knives being in a common plane, a pivoted knife carrier, pivot means supporting said knife carrier on said frame, said pivot means being located at a point spaced from one end of said pair of knives a substantial distance below the top thereof, and a knife supported longitudinally on said knife carrier and adapted to be received in the opening between the pair of knives, said knife having a plurality of deep V-shaped serrations on the bottom thereof forming cutting edges, each of said serrations having two sides of substantial length connected at their top, said last named knife being positioned so that the V-shaped serration at the end closest to said pivot means will extend from a point between said pivot means and said pair of shear knives to a point a substantial distance toward the opposite end of said pair of shear knives, the side of said last described serration having a two sided notch therein intermediate its length, said serrated knife being movable into the opening between the pair of knives to cut said sheet, said serrated knife first contacting said sheet at the point of connection between the first and second serrations, the notch in said longitudinal knife being so positioned that its side adjacent said pivot means will cooperate with the said one end of the pair of knives to cut said flange.

References Cited by the Examiner

UNITED STATES PATENTS

| | | | |
|---|---|---|---|
| 2,219,602 | 10/1940 | Rayner | 83—607 |
| 2,496,018 | 1/1950 | Pearson | 83—607 |
| 2,563,741 | 8/1951 | Patton | 83—607 |
| 3,004,458 | 10/1961 | Dvorak | 83—607 |
| 3,134,285 | 5/1964 | Greene | 83—607 |
| 3,180,194 | 4/1965 | Locke | 83—607 |

WILLIAM W. DYER, JR., *Primary Examiner.*

L. B. TAYLOR, *Assistant Examiner.*